No. 608,658. W. W. ELLIS. Patented Aug. 9, 1898.
CORN PLANTER.
(Application filed Dec. 21, 1897.)
(No Model.)

Witnesses
Harry L. Amer
C. E. Hunt

Inventor
William W. Ellis.
by O. S. Stockbridge
his Attorney.

THE NORRIS PETERS CO., PHOTO-LITHO., WASHINGTON, D. C.

UNITED STATES PATENT OFFICE.

WILLIAM WESLEY ELLIS, OF EDGEWOOD, TEXAS.

CORN-PLANTER.

SPECIFICATION forming part of Letters Patent No. 608,658, dated August 9, 1898.

Application filed December 21, 1897. Serial No. 662,778. (No model.)

*To all whom it may concern:*

Be it known that I, WILLIAM WESLEY ELLIS, a citizen of the United States, residing at Edgewood, in the county of Van Zandt and State of Texas, have invented certain new and useful Improvements in Corn-Planters; and I do hereby declare the following to be a full, clear, and exact description of the invention, such as will enable others skilled in the art to which it appertains to make and use the same.

This invention relates to a novel corn-planter, and has for its object the production of a simple, durable, and efficient planting attachment which may be applied to an ordinary plow and which when so applied will automatically effect the distribution of corn or other grain at desired intervals.

To the accomplishment of this object the invention consists in certain novel features and details of construction and arrangement of parts, as will hereinafter more fully appear.

Figure 1:
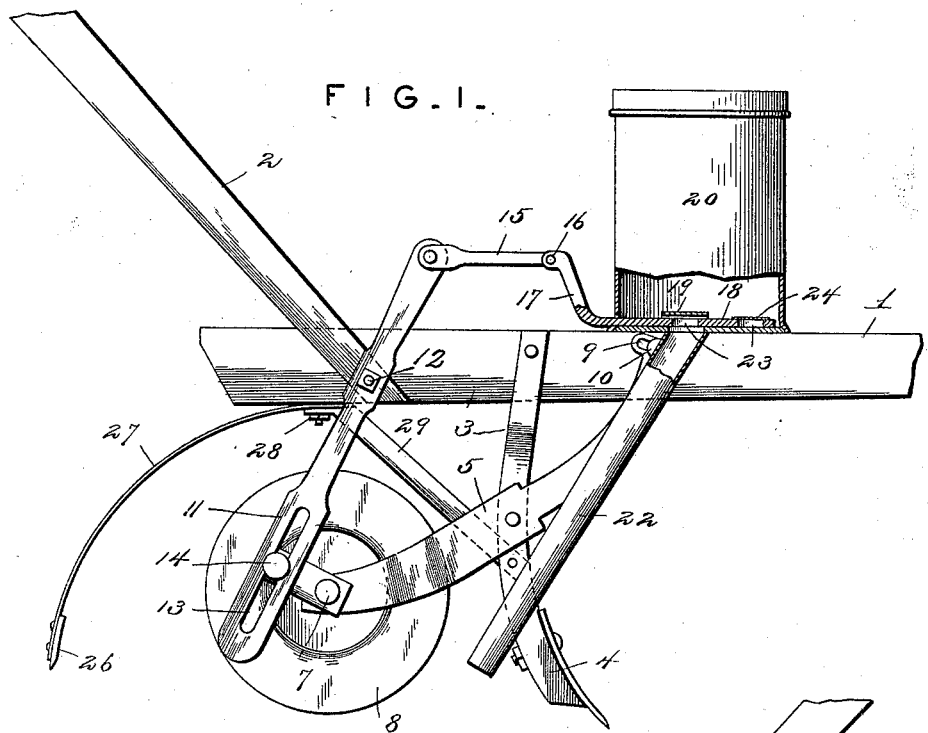
Figure 2:
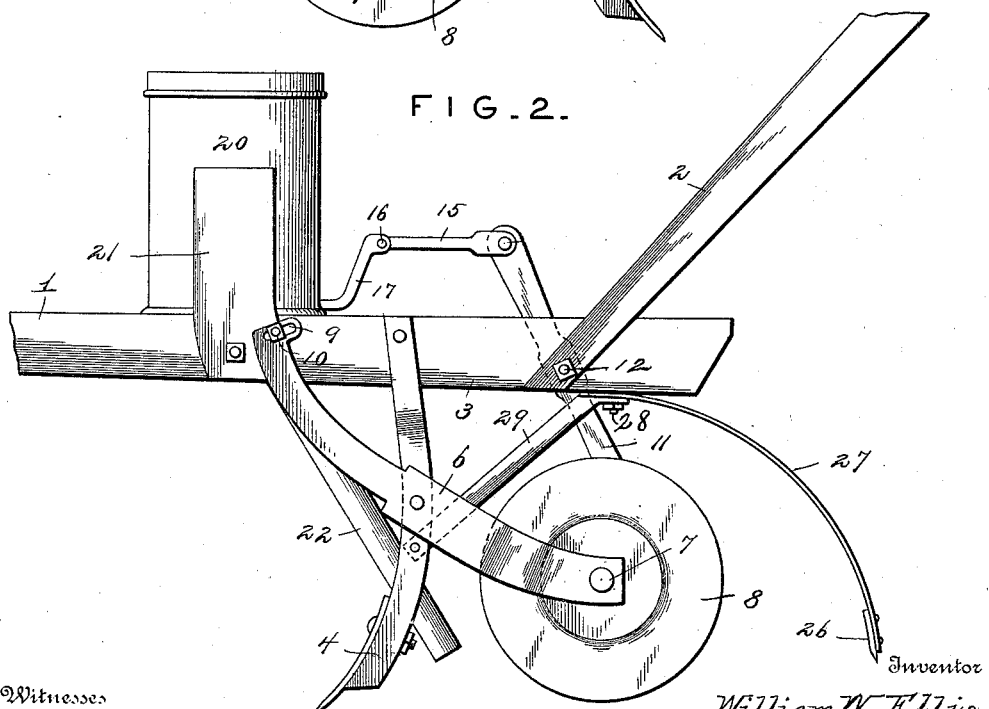

Referring to the drawings, Figure 1 is a side elevation of my device complete. Fig. 2 is a similar view thereof from the opposite side.

Referring to the numerals on the drawings, 1 indicates an ordinary plow-beam provided with the usual handles 2, stock 3, and share 4. 5 and 6 indicate a pair of wheel-supporting arms pivoted medially to the plow-stock immediately above the share, and between the rear ends of which is journaled, upon a suitable shaft 7, a wheel 8, curved slots 9 being provided in the opposite or upper end of the arms 5 and 6 for the reception of the opposite ends of the bolt 10, which passes through the beam 1 and engages the slots in the arms, which extend upon the opposite sides of the beam and are adjustably retained in proper positions by the bolt, which is provided with a head and nut upon its opposite ends, designed to clamp the arms securely to the beam. It is obvious that by loosening the nut the arms may be swung upon their pivot a distance determinable by the length of the slots and that in this manner the wheel may be adjusted at the proper height in order to regulate the depth of the plow.

11 indicates a vertical oscillatory lever pivoted, as at 12, to the beam immediately above the wheel, provided with an elongated slot 13 at its lower end for the reception of the crank 14, keyed or otherwise secured to the contiguous end of the shaft supporting the wheel.

15 indicates a pitman pivoted to the upper end of lever 11 and likewise pivotally connected, as at 16, to a tailpiece 17, extending from a sliding valve or gate 18, movable in suitable guides 19 at the bottom of a hopper or seedbox 20, secured, as by a bracket 21, to the beam 1, and from the bottom of which extends to a point immediately in front of the wheel a discharge-spout 22. The opening to the spout is controlled by the slide, which is provided with one or more apertures 23, which when brought into alinement with the spout permits the grain to be deposited behind the plow and into the furrow made thereby.

For the purpose of regulating the number of grains to the hill one or more of the series of apertures 23 may be closed by means of slides or gates 24, whereby any number of apertures may be opened or closed.

It will now be seen that as the plow is drawn the wheel will serve to steady it, will regulate the depth of the furrow, and through the lever and the connected mechanism will cause the corn to be dropped at proper intervals into the furrow immediately in the rear of the plow, and it simply remains to describe the covering device located in the rear of the wheel and designed to cover the deposited grain. This device consists of a scraper or coverer 26, supported by a pair of downwardly-curved spring-supports 27, adjustably secured to the bottom of the beam adjacent to its rear end by the bolt 28, which secures the upper end of the brace 29 to the beam, and it is obvious that, if desired, the coverer or scraper may be removed from the spring-supports, and shovel-plows may be attached thereto when desirable; but while the present embodiment of my invention appears at this time to be preferable, I do not desire to limit myself to the structural details illustrated and described, but reserve the right to change, modify, or vary them at will within the scope of the protection granted.

What I claim is—

1. A corn-planter involving the combination of a plow, a pair of arms pivoted to the plow-stock, each provided with a slot, a bolt passing through the plow-beam and engaging the slots, a wheel carried by a shaft journaled in the lower ends of the slotted arms, a lever supported by the beam provided with a depending spout, an apertured slide movable within the hopper to control the discharge through the spout, a crank secured at one end of the wheel-shaft, and a vibratory lever provided with an elongated slot operatively connected with the crank and the slide, substantially as specified.

2. The combination with a plow, of a pair of pivoted arms carried by the plow-stock and provided adjacent to their upper ends with curved slots, a bolt passing through the plow-beam and engaging the slots, a wheel carried by a shaft journaled in the lower ends of the pivoted supporting-arms, a crank at one end of the shaft, a vibratory lever pivoted to the beam and provided with an elongated slot in its lower end for the reception of the crank, a hopper supported upon the beam and provided with a depending discharge-spout, a slide designed to control the discharge through said spout provided with a plurality of apertures, and auxiliary slides controlling said apertures, a pitman pivotally connected with the upper end of the lever and with the slide, and a scraper or coverer adjustably carried in the rear of the wheel by a pair of spring-supports, substantially as specified.

In testimony whereof I affix my signature in presence of two witnesses.

WILLIAM WESLEY ELLIS.

Witnesses:
   D. S. NELMS,
   D. J. DOSSEY.